United States Patent
Nelson

[11] 3,856,739
[45] Dec. 24, 1974

[54] PLASTICIZED VINYL CHLORIDE POLYMERS CONTAINING ALKYLOXYMETHYL DIPHENYL OXIDES

[75] Inventor: David A. Nelson, Littleton, Colo.

[73] Assignee: The Dow Chemical Company, Midland, Mich.

[22] Filed: Mar. 7, 1974

[21] Appl. No.: 449,144

[52] U.S. Cl. .................. 260/33.2 R, 260/613 R
[51] Int. Cl. ................................. C08f 45/34
[58] Field of Search ................. 260/33.2 R, 613 R

[56] References Cited
UNITED STATES PATENTS
| | | | |
|---|---|---|---|
| 3,048,600 | 8/1962 | Jaruzelski | 260/33.2 R |
| 3,342,873 | 9/1967 | Doedens | 260/613 R |
| 3,749,693 | 7/1973 | Cooper | 260/613 R |

*Primary Examiner*—Allan Lieberman
*Assistant Examiner*—J. H. Derrington
*Attorney, Agent, or Firm*—Ronald G. Brookens

[57] ABSTRACT

Plasticized vinyl chloride polymer containing a major proportion of polymerized vinyl chloride and as a plasticizing agent therefore a compound of the formula:

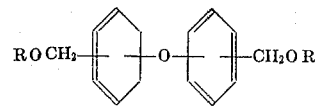

wherein R is selected from the group consisting of methyl, ethyl, propyl and butyl radicals.

3 Claims, No Drawings

PLASTICIZED VINYL CHLORIDE POLYMERS CONTAINING ALKYLOXYMETHYL DIPHENYL OXIDES

BACKGROUND OF THE INVENTION

The phthalate esters, particularly di-(2-ethylhexyl) phthalate and the like, are the major plasticizing agents used in vinyl chloride polymers and particularly, polyvinyl chloride. Such plasticizing agents are not readily biodegradable, however, and have been shown to bioaccumulate in crustaceans, fish and mammals. The alkoxymethyl diphenyl oxides, as described herein, have shown excellent plasticizer activity in vinyl chloride polymers and are more readily capable of biodegradation and thus are ecologically desirable substitutes for various plasticizer applications.

SUMMARY

Plasticized vinyl chloride polymers are formed by utilization, as a plasticizing agent, of from about 40 to about 60 parts per hundred parts of polymer of a compound of the formula:

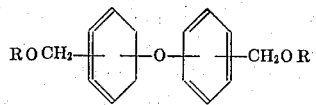

wherein R is selected from the group consisting of methyl, ethyl, propyl and butyl radicals.

DESCRIPTION OF THE PREFERRED EMBODIMENTS

This invention is applicable to vinyl chloride polymers as a class and within this term are included both polyvinyl chloride and copolymers of vinyl chloride in a major proportion with other compounds, especially vinyl compounds, in a minor proportion by weight of the final resin. The vinyl chloride can be polymerized in bulk, in solution or as an emulsion of liquid vinyl chloride in water. After-chlorinated polyvinyl chloride also can be treated in accordance with the invention.

The molecular weight of the vinyl chloride polymer is not critical, and would be selected to produce a composition of the desired softening point after plasticization. The molecular orientation of the polymers is not critical. The polymers and copolymers can contain stabilizers against decomposition if desired; conventional stabilizers well known to the art can be used.

The plasticizing agents used herein may be any compound having the formula:

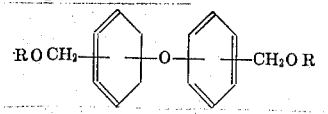

wherein R is selected from the group consisting of methyl, ethyl, propyl and butyl radicals. Exemplary of such compounds are the ortho, meta and para bis(methoxymethyl)-diphenyl oxides, bis(ethoxymethyl) diphenyl oxides, bis-(butoxymethyl)diphenyl oxides, and compounds containing mixtures of the designated alkoxy groups. A method for the preparation of these compounds is set forth in U.S. Pat. No. 3,342,873.

The plasticizing agents may be employed in any amount which is compatible with the vinyl chloride polymer. Generally, however, amounts of such compounds of from about 40 to about 60 parts per one hundred parts of polymer, are preferred.

The following specific example illustrates the present invention but is not to be construed as limiting:

To 200 grams of polyvinyl chloride resin (Geon 102 EP), which was warmed to a temperature of 88°C in a powder head of a Brabender instrument, was added, over a 3 minute period, 80 grams of bis(methoxymethyl) diphenyl oxide. The dry-up time, i.e., the time required for the blend to assume an essentially dry consistency, was 1.5 minutes. By way of comparison, utilization of the same amount of the conventionally used di(2-ethylhexyl)phthalate as the plasticizing agent required a dry-up time of 3.5 minutes. The powder containing the bis(methoxymethyl)diphenyl oxide (bis-MMDPO) was then heated at 170°C in the fusion head of the Brabender instrument until the fusion point of the mixture had been surpassed. The resulting gum-like mass was then cut into individual pieces and molded at 170°C, under a pressure of about 20 tons, over a period of from about 3 to 5 minutes, or, alternatively, cooled and ground in the presence of liquid nitrogen for powder molding. Utilization of either procedure resulted in molded articles having flexibility and strength properties substantially equal to or surpassing articles prepared in the same way but plasticized with equal amounts of di(2-ethylhexyl)-phthalate (DEHP). The following Table I, sets forth such properties.

TABLE I

| | | Bis-MMDPO | DEHP |
|---|---|---|---|
| Tensile Strength (psi) | | 3339 | 2764 |
| 100% Modulus (psi) | | 1645 | 1166 |
| Elongation (%) | | 253 | 274 |
| Hardness (10 seconds) | | 87 | 89 |
| Volatility %[1] | | 5.40 | 1.16 |
| Extractability % | Hexane[2] | 0.44 | 8.12 |
| | Soapy Water[3] | 9.63 | 3.04 |
| | Mineral Oil[4] | 11.64 | 5.25 |

[1] 24 hours 80°C
[2] 24 hours 23°C
[3] 96 hours 70°C
[4] 24 hours 70°C

Similar good results are obtained using any of the plasticizing agents prescribed by the present invention.

By way of comparison, utilization, in the manner described herein, of the mono(alkoxyalkyl)diphenyl oxides such as mono(methoxymethyl)diphenyl oxide as the plasticizing agent, failed to provide significant lasting plasticization of the polyvinylchloride polymer.

What is claimed is:

1. A plasticized vinyl chloride polymer containing a major proportion of polymerized vinyl chloride and as a plasticizing agent therefore from between about 40 and about 60 parts per hundred parts of polymer of a compound of the formula:

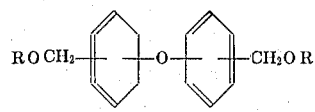

wherein R is selected from the group consisting of methyl, ethyl, propyl and butyl radicals.

2. The composition of claim 1 wherein said vinyl chloride polymer is polyvinylchloride.

3. The composition of claim 1 wherein said plasticizing agent is bis(methoxymethyl)diphenyl oxide.

* * * * *